United States Patent
Sakata

(10) Patent No.: US 9,884,953 B2
(45) Date of Patent: Feb. 6, 2018

(54) POLYBUTYLENE TEREPHTHALATE RESIN COMPOSITION AND MOLDED ARTICLE THEREOF

(75) Inventor: Kouichi Sakata, Shizuoka (JP)

(73) Assignee: WINTECH POLYMER LTD., Minato-Ku, Tokyo (JP)

(*) Notice: Subject to any disclaimer, the term of this patent is extended or adjusted under 35 U.S.C. 154(b) by 610 days.

(21) Appl. No.: 12/996,450

(22) PCT Filed: Jun. 10, 2009

(86) PCT No.: PCT/JP2009/002607
§ 371 (c)(1),
(2), (4) Date: Dec. 6, 2010

(87) PCT Pub. No.: WO2009/150830
PCT Pub. Date: Dec. 17, 2009

(65) Prior Publication Data
US 2011/0092626 A1    Apr. 21, 2011

(30) Foreign Application Priority Data

Jun. 11, 2008 (JP) ................................. 2008-153149

(51) Int. Cl.
C08K 5/29 (2006.01)
B29C 45/00 (2006.01)
C08K 3/40 (2006.01)
C08K 7/02 (2006.01)
C08K 7/14 (2006.01)

(52) U.S. Cl.
CPC .................. C08K 7/02 (2013.01); C08K 5/29 (2013.01); C08K 7/14 (2013.01)

(58) Field of Classification Search
USPC ............................... 524/195, 605; 264/328.1
See application file for complete search history.

(56) References Cited

U.S. PATENT DOCUMENTS

| | | | |
|---|---|---|---|
| 4,859,741 A | 8/1989 | Takahashi et al. | |
| 5,130,360 A * | 7/1992 | Ulrich | 524/195 |
| 6,512,027 B2 | 1/2003 | Kanai et al. | |
| 6,855,758 B2 * | 2/2005 | Murschall et al. | 524/195 |
| 8,210,213 B2 * | 7/2012 | Miyamoto et al. | 138/137 |
| 2001/0016263 A1 | 8/2001 | Doteguchi et al. | |
| 2005/0228113 A1 * | 10/2005 | Baumer et al. | 524/500 |
| 2005/0256223 A1 * | 11/2005 | Kolb et al. | 523/116 |

FOREIGN PATENT DOCUMENTS

| | | | |
|---|---|---|---|
| JP | 60-210659 A | | 10/1985 |
| JP | S63-003055 A | | 1/1988 |
| JP | 3-285945 A | | 12/1991 |
| JP | 09-124908 | * | 5/1997 |
| JP | 9-124908 A | | 5/1997 |
| JP | 2005-290176 A | | 10/2005 |
| JP | 2007-92604 A | | 4/2007 |
| JP | 2007-112858 | * | 5/2007 |
| JP | 2007-112858 A | | 5/2007 |
| JP | 2007-138018 | * | 6/2007 |

OTHER PUBLICATIONS

International Search Report (PCT/ISA/210) dated Sep. 8, 2009.
Machine translation of JP 06-009861; Jan. 1994.
Office Action dated Oct. 17, 2016, by the Chinese Patent Office in corresponding Chinese Patent Application No. 201510223497.8. (8 pages).
"Plastic molding technology and die design (corrected version)", pp. 57-58, Aug. 31, 2007. (6 pages).
"Professional experiment textbook of polymer material and process" 1st edition, "Experiment 9: Determination of the melt flow rate of thermoplastics", p. 172, Sep. 30, 2007. (4 pages).

* cited by examiner

*Primary Examiner* — Tae H Yoon
(74) *Attorney, Agent, or Firm* — Buchanan Ingersoll & Rooney PC

(57) ABSTRACT

The present invention provides a polybutylene terephthalate resin composition which does not induce swelling and bleeding of elastomer component caused by an organic solvent such as fuel, having performance of a high durability and the like in a cold cycle environment, and having an excellent resistance to hydrolysis. Specifically, relative to 100 parts by weight of a polybutylene terephthalate resin (A) having 30 meq/kg or less of the amount of terminal carboxyl groups, there are added a carbodiimide compound (B) in an amount of 0.3 to 1.5 equivalents of the carbodiimide functional group when the amount of carboxyl terminal group in the polybutylene terephthalate resin (A) is set as 1, and 20 to 100 parts by weight of a fibrous filler (C).

2 Claims, No Drawings

POLYBUTYLENE TEREPHTHALATE RESIN COMPOSITION AND MOLDED ARTICLE THEREOF

This application is a 371 National Stage Application of International Application No. PCT/JP2009/002607 filed Jun. 10, 2009, which claims priority to Japanese Patent Application No. 2008-153149 filed Jun. 11, 2008, the entire contents of each of these applications being incorporated herein by reference in their entirety.

TECHNICAL FIELD

The present invention relates to a polybutylene terephthalate resin composition and a molded article thereof which are excellent in high strength and resistance to heat shock.

BACKGROUND ART

Polybutylene terephthalte resins are used as engineering plastics in wide fields including automobile parts, electric and electronic parts, or the like owing to their excellent mechanical properties, electric properties, and other physical and chemical properties, and their good workability. In particular, since their heat resistance and strength can be increased by adding a fibrous filler such as glass fiber thereto, polybutylene terephthalte resins are often used by reinforcing thereof by the fibrous filler.

On the other hand, for the parts (insert molded articles) being mounted in an environment of severe temperature increase/decrease, such as engine room of automobile, the toughness of the parts is often improved by adopting an elastomer and the like to prevent crack generation caused by strain resulting from the difference in linear expansion between metal and resin. Many kinds of compositions have been proposed for that purpose.

For example, JP-A 3-285945 discloses the improvement in the resistance to heat shock by adding an elastomer such as ethylene-alkyl acrylate to polybutylene terephthalate. The resin, however, does not exhibit satisfactory resistance to heat shock and does not exhibit satisfactory resistance to hot water, although the improvement effect of those resistances is recognized in comparison with that of non-additive resin.

JP-A 60-210659 discloses the improvement of the resistance to hot water by adding an elastomer such as ethylene-alkyl acrylate and carbodiimide to polybutylene terephthalate. That kind of composition, however, does not exhibit satisfactory resistance to heat shock, although the resistance to hot water is improved.

Furthermore, there are cases where the use of polybutylene terephthalate material containing an elastomer as the parts exposed to fuel vapor raises problems of poor strength, swelling and bleeding of the elastomer component. For example, a butterfly valve and the like used in the fuel suction line is made by metal insert molding. The butterfly valve and the like, however, have problems of strength and wear, and there is a concern regarding a possibility of mal-functioning caused by swelling and adhesion of the elastomer component. These kinds of parts made by insert molding and exposed to fuel vapor include evapo-purge valve.

DISCLOSURE OF THE INVENTION

The present invention has been made to solve the above technical problems, and an object of the present invention is to provide a polybutylene terephthalate resin composition without swelling and bleeding of elastomer component caused by organic solvent such as fuel, having performance of high durability and the like in cold cycle environment, and further having excellent resistance to hydrolysis, and to provide a molded article thereof.

The inventors of the present invention have conducted detail studies to obtain a polybutylene terephthalate resin composition capable of achieving the above object, and have found that a composition which is made up mainly of a polybutylene terephthalate resin having 30 meq/kg or less of terminal carboxyl groups and to which a specific amount of a carbodiimide compound and a fibrous filler are added in combination gives extremely high resistance to heat shock and resistance to hydrolysis without significant deterioration in the mechanical properties and the resistance to organic solvent, thus having completed the present invention.

That is, the present invention provides a polybutylene terephthalate resin composition, obtained by blending a carbodiimide compound (B) in an amount of 0.3 to 1.5 equivalents of carbodiimide functional groups when the amount of the carboxyl terminal groups in the polybutylene terephthalate resin (A) is set as 1; and 20 to 100 parts by weight of a fibrous filler (C) with 100 parts by weight of a polybutylene terephthalate resin (A) having 30 meq/kg or less of terminal carboxyl groups; and a molded article obtained by molding the resin composition, especially an insert injection-molded article.

The present invention also provides a polybutylene terephthalate resin composition, containing:
100 parts by weight of a polybutylene terephthalate resin (A) having 30 meq/kg or less of terminal carboxyl groups;
a carbodiimide compound (B) in an amount of 0.3 to 1.5 equivalents of carbodiimide functional groups when the amount of the carboxyl terminal groups in the polybutylene terephthalate resin (A) is set as 1; and
20 to 100 parts by weight of a fibrous filler (C).

The present invention further provides a method of manufacturing the above polybutylene terephthalate resin composition, including blending: 100 parts by weight of a polybutylene terephthalate resin (A) having 30 meq/kg or less of terminal carboxyl groups; a carbodiimide compound (B) in an amount of 0.3 to 1.5 equivalents of the carbodiimide functional group when the amount of terminal carboxyl groups in the polybutylene terephthalate resin (A) is set as 1; and 20 to 100 parts by weight of a fibrous filler (C).

The present invention further provides a method of manufacturing a molded article or an insert-molded article of the above polybutylene terephthalate resin composition having 120 MPa or higher tensile strength in accordance with ISO 527, including performing injection molding of the above polybutylene terephthalate resin composition.

The present invention further provides a use of the above polybutylene terephthalate resin composition having 120 MPa or higher tensile strength in accordance with ISO 527 as parts exposed to an organic solvent or vapor of the organic solvent.

The present invention provides a polybutylene terephthalate resin composition having excellent performance of high durability and the like in a cold cycle environment and having excellent resistance to hydrolysis. Since the polybutylene terephthalate resin composition of the present invention does not contain elastomer component, no swelling and bleeding of the elastomer component occurs even under exposure to vapor of organic solvent such as fuel (gasoline, gas oil, and the like), and thus the resin composition is useful as an insert-molded article used in such application (evapo-purge valve and the like).

DETAILED DESCRIPTION OF THE INVENTION

The structural components of the resin material of the present invention will be described in detail in the following. The (A) polybutylene terephthalate resin which is the basic resin of the resin composition of the present invention is a polybutylene terephthalate-based resin which is obtained by polycondensation of a dicarboxylic acid component containing at least terephthalic acid or an ester-forming derivative thereof (such as lower alcohol ester) and a glycol component containing at least a C4 alkylene glycol (1,4-butane diol) or an ester-forming derivative thereof. The polybutylene terephthalate resin is not limited to the homo-polybutylene terephthalate resin, and may be a copolymer containing 60% by mole or more, specifically about 75 to 95% by mole, of butylene terephthalate unit.

The polybutylene terephthalate resin in the present invention is produced by dissolving a crushed polybutylene terephthalate sample in benzyl alcohol for 10 minutes at 215° C., followed by titrating the solution by using an aqueous solution of 0.01N sodium hydroxide to thereby be used as the polybutylene terephthalate resin having 30 meq/kg or less of the amount of terminal carboxyl groups measured, preferably 25 meq/kg or less thereof.

The use of a polybutylene terephthalate resin having more than 30 meq/kg of the amount of terminal carboxyl groups deteriorates the effect of improving the resistance to heat shock even by controlling the amount to be added of carbodiimide compound, and increases the lowering of the strength by hydrolysis in a moist-heat environment.

The lower limit of the amount of terminal carboxyl groups is not specifically limited. However, the polybutylene terephthalate resin having less than 5 meq/kg of the amount of terminal carboxyl groups is generally difficult to be produced, and the resin having less than 5 meq/kg thereof does not allow the reaction with carbodiimide compound to proceed sufficiently, which may result in insufficient effect of improving the resistance to heat shock. Accordingly, the amount of terminal carboxyl groups in the polybutylene terephthalate resin is preferably 5 meq/kg or more, and specifically preferably 10 meq/kg or more.

Furthermore, the intrinsic viscosity (IV) of the applied (A) polybutylene terephthalic resin is preferably within the range of 0.67 to 0.90 dL/g. If the intrinsic viscosity exceeds 0.90 dL/g, the flowability at the time of molding necessary for the insert-molding article cannot be attained in some cases. The intrinsic viscosity of 0.90 dL/g or less can also be attained by blending polybutylene terephthalate resins having different intrinsic viscosities from each other, for example, the one having an intrinsic viscosity of 1.00 dL/g and the one having an intrinsic viscosity of 0.70 dL/g. The intrinsic viscosity can be determined, for example, in o-chlorophenol at 35° C.

In the polybutylene terephthalate resin, examples of the dicarboxylic acid component (comonomer component) other than terephthalic acid and an ester-forming derivative thereof are: an aromatic dicarboxylic acid component (such as $C_6$-$C_{12}$ aryldicarboxylic acid including isophthalic acid, phthalic acid, naphthalene dicarboxylic acid, and diphenyl ether dicarboxylic acid) ; an aliphatic dicarboxylic acid component (such as $C_4$-$C_{16}$ alkyldicarboxylic acid including succinic acid, adipic acid, azelaic acid, and sebacic acid, and $C_5$-$C_{10}$ cycloalkyl dicarboxylic acid including cyclohexane dicarboxylic acid); and an ester-forming derivative thereof. Those dicarboxylic acid components can be used alone or in combination of two or more thereof.

Preferable dicarboxylic acid component (comonomer component) includes an aromatic dicarboxylic acid component (specifically $C_6$-$C_{10}$ aryl dicarboxylic acid such as isophthalic acid) and an aliphatic dicarboxylic acid component (specifically $C_6$-$C_{12}$ alkyl dicarboxylic acid such as adipic acid, azelaic acid or and sebacic acid).

Examples of glycol component (comonomer component) other than 1,4-butane diol are: an aliphatic diol component (such as alkylene glycol (including $C_2$-$C_{10}$ alkylene glycol such as ethylene glycol, propylene glycol, trimethylene glycol, 1,3-butylene glycol, hexamethylene glycol, neopenthyl glycol or 1,3-octane diol, and polyoxy $C_2$-$C_4$ alkylene glycol such as diethylene glycol, triethylene glycol or dipropylene glycol) or alicyclic diol such as cyclohexane dimethanol or hydrogenated bisphenol A); an aromatic diol component (such as aromatic alcohol including bisphenol A and 4,4-dihydroxybiphenyl, or $C_2$-$C_4$ alkyleneoxide adduct of bisphenol A (for example, 2-mole adduct of ethylene oxide of bisphenol A and 3-mole adduct of propylene oxide of bisphenol A)); and an ester-forming derivative thereof. These glycol components can also be used alone or in combination of two or more thereof.

Preferred glycol component (Comonomer component) includes an aliphatic diol component (specifically $C_2$-$C_6$ alkylene glycol, polyoxy $C_2$-$C_3$ alkylene glycol such as diethylene glycol, and alicyclic diol such as cyclohexane dimethanol).

Any of the polybutylene terephthalate-based polymers obtained by polycondensation of above compounds as the monomer components can be used as the (A) component of the present invention. The combined use of homo-polybutylene terephthalate polymer and polybutylene terephthalate copolymer is also useful.

The (B) carbodiimide compound used in the present invention is a compound having carbodiimide group (—N=C=N—)in the molecule. Applicable carbodiimide compound includes an aliphatic carbodiimide compound having the aliphatic main chain, an alicyclic carbodiimide compound having the alicyclic main chain, and an aromatic carbodiimide compound having the aromatic main chain, and a preferred one is an aromatic carbodiimide compound in terms of resistance to hydrolysis.

Examples of the aliphatic carbodiimide compound include diisopropyl carbodiimide, dioctyldecyl carbodiimide, or the like. An example of the alicyclic carbodiimide compound includes dicyclohexyl carbodiimide, or the like.

Examples of aromatic carbodiimide compound include: a mono- or di-carbodiimide compound such as diphenyl carbodiimide, di-2,6-dimethylphenyl carbodiimide, N-tolyl-N'-phenyl carbodiimide, di-p-nitrophenyl carbodiimide, di-p-aminophenyl carbodiimide, di-p-hydroxyphenyl carbodiimide, di-p-chlorophenyl carbodiimide, di-p-methoxyphenyl carbodiimide, di-3,4-dichlorophenyl carbodiimide, di-2,5-dichlorophenyl carbodiimide, di-o-chlorophenyl carbodiimide, p-phenylene-bis-di-o-tolyl carbodiimide, p-phenylene-bis-dicyclohexyl carbodiimide, p-phenylene-bis-di-p-chlorophenyl carbodiimide or ethylene-bis-diphenyl carbodiimide; and a polycarbodiimide compound such as poly(4,4'-diphenylmethane carbodiimide), poly(3,5'-dimethyl-4,4'-biphenylmethane carbodiimide), poly(p-phenylene carbodiimide), poly(m-phenylene carbodiimide), poly(3,5'-dimethyl-4,4'-diphenylmethane carbodiimide), poly(naphthylene carbodiimide), poly(1,3-diisopropylphenylene carbodiimide), poly(1-methyl-3,5-diisopropylphenylene carbodiimide), poly(1,3,5-triethylphenylene carbodiimide) or poly(triisopropylphenylene carbodiimide). These compounds can be used in combination of two or more of them. Among these, specifically preferred ones to be used are di-2,6-dimethylphenyl carbodiimide, poly(4,4'-diphenylmethane carbodiimide), poly(phenylene carbodiimide), and poly(triisopropylphenylene carbodiimide).

A preferred (B) carbodiimide compound to be used is the one having 2000 or larger molecular weight. The one having a molecular weight of less than 2000 may generate gas and odor when the retention time is long during melt-kneading and during molding.

The blending amount of (B) carbodiimide compound corresponds to the amount of carbodiimide functional group within the range of 0.3 to 1.5 equivalents when the amount of the terminal carboxyl groups in the (A) polybutylene terephthalate resin is set as 1.

If the amount of (B) component is excessively small, the effect of improving the resistance to heat shock, which is an object of the present invention, cannot be attained. If the amount thereof is excessively large, there likely appears the lowering of flowability and the generation of gel component and carbide at the time of compounding and molding processing, and appear the deterioration of mechanical characteristics such as tensile strength and flexural strength, and the rapid decrease in strength in a moist heat environment. This is because of the deterioration of adhesion between the polybutylene terephthalate resin and the fibrous filler caused by the (B) component. A preferred blending amount of the (B) component corresponds to the amount of carbodiimide functional group within the range of 0.5 to 1.5 equivalents, and more preferably 0.8 to 1.2 equivalents.

Examples of the (C) fibrous filler used in the present invention include glass fiber, carbon fiber, potassium titanate fiber, silica-alumina fiber, zirconia fiber, metal fiber, organic fiber, or the like. Among these, glass fiber is preferred.

For the glass fiber, any of known glass fibers is preferably used irrespective of the fiber diameter, the shape such as cylinder, cocoon, or elliptical cross section of the glass fiber, and the length of and the cutting method in manufacturing chopped strand, roving, or the like. Although the present invention is independent of the kind of glass, preferred ones are E-glass and corrosion-resistant glass containing zirconium element in the composition in view of the quality.

According to the present invention, in order to improve the characteristic of interface between the fibrous filler and the resin matrix, a fibrous filler surface-treated by using an organic treatment agent such as amino-silane compound and epoxy compound is specifically preferred, and a glass fiber containing 1% by weight or more of organic treatment agent, expressed by the loss on heating, is specifically preferred. Preferable amino-silane compound and epoxy compound used in those fibrous fillers are any of known ones, irrespective of the kind of amino-silane and epoxy compound used for the surface treatment of the fibrous filler according to the present invention.

The amount of (C) fibrous filler to be used is 20 to 100 parts by weight relative to 100 parts by weight of the (A) polybutylene terephthalate resin. If the amount of (C) fibrous filler is smaller than the above range, the variations in linear expansion accompanied with the cold cycle become large, which is not preferable in view of resistance to heat shock. If the amount of (C) fibrous filler to be used exceeds the above range, the allowable strain of the material decreases, which is unfavorable from the point of resistance to heat shock. The amount of (C) fibrous filler is preferably within the range of 20 to 80 parts by weight, and more preferably 30 to 60 parts by weight.

Meanwhile, the present invention allows the combined blending of a non-fibrous filler which has no fibrous shape as in the case of the (C) component, that is to say, an inorganic filler in plate shape or granular shape, or a mixture thereof. Such non-fibrous filler includes glass flake, glass bead, mica, talc, carbon black, calcium carbonate, or the like.

In order to further impart a desired characteristic depending on the object, the composition of the present invention can contain known substances which are commonly added to thermoplastic resins and thermosetting resins, such as stabilizer including antioxidant, heat-stabilizer, or UV absorber, antistatic agent, coloring agent such as dye or pigment, lubricant, plasticizer, crystallization accelerator, crystal nucleating agent, or epoxy compound within the range not deteriorating the effect of the present invention.

In particular, although antistatic agent, coloring agent, lubricant, and plasticizer often contain carboxyl groups, hydroxyl group, and amino group, these functional groups are preferably not contained because they likely react with carbodiimide group.

In the present invention, in order to improve the moldability, a mold releasing agent can be added. Any type of mold releasing agent can be preferably applied, including olefin-based polymer, aliphatic amide compound, and aliphatic ester compound. Specifically preferred mold releasing agent is an olefin-based polymer presumed to have low reactivity with carbodiimide compound, or an aliphatic ester compound having 100 or less of hydroxyl group value determined by the Japan Oil Chemists' Society Method 2,4,9,2-71 (Pyridine-acetic anhydride method).

Additive containing carboxyl groups, hydroxyl group, or amino group is preferably not used.

The resin composition to be used in the present invention can be easily prepared by facilities and method commonly used as the conventional resin composition preparation method. Examples are: (1) the method in which the respective components are mixed together, and the mixture is kneaded in and extruded from a single screw or twin screw extruder to form pellets, followed by molding; (2) the method in which pellets having different compositions from each other are prepared, and specified amounts of the respective pellets are mixed together to be subjected to molding, and then the molded article having a desired composition is obtained; and (3) the method in which one or more components are directly supplied to the molding machine. Any of above-given methods can be applied. The method in which a portion of a resin component is prepared in fine powder form, which is then mixed with other components, is a preferred one to attain homogeneous blending of the components.

In preparing pellets kneaded by using an extruder, the temperature of cylinder of the extruder is preferably set so that the temperature of resin in the extruder is within the range of 240° C. to 300° C., and more preferably 250° C. to 270° C. If the temperature thereof is below 240° C., the reaction between polybutylene terephthalate and carbodiimide becomes insufficient, and thus, resistance to hydrolysis and resistance to heat-shock may be insufficient, or excessively high viscosity of molten material may result in breaking fibrous filler, which may finally lead to failing to attain necessary mechanical properties. When the temperature of the resin exceeds 300° C., the resin decomposition likely occurs, and the resistance to hydrolysis and the resistance to heat shock may become insufficient.

In the same way as in molding, it is preferable to set the temperature of cylinder of the extruder so that the resin temperature in the molding machine is within the range of 240° C. to 300° C., and more preferably 250° C. to 270° C. Outside that temperature range, insufficient properties may result in the same way as in the above case. The mold temperature at the time of injection molding is preferably within the range of 40° C. to 100° C., more preferably 60° C. to 90° C. If the mold temperature is below 40° C., the post-shrinkage occurs and strain is generated to thereby fail in attaining a desired shape or to fail in attaining sufficient resistance to heat shock. If the mold temperature exceeds 100° C., the molding cycle takes a long time, which deteriorates the mass-production performance.

Furthermore, the (B) carbodiimide compound can be blended as the master batch made up of a resin as the matrix, and the use of master batch is often easy in terms of practical handling. A master batch of polybutylene terephthalate resin is preferably used. However, a master batch prepared by other resins may also be applicable. In the case of master batch of polybutylene terephthalate resin, the amount of the master batch may be adjusted so as to assure the range of specified blending amount of the (B) carbodiimide compound. The master batch may be preliminarily added at the time of melting and kneading to form homogeneous pellets. Alternatively, components other than the carbodiimide compound are preliminarily formed as homogeneous pellets by melt-kneading and the like, and the pellet-blend, in which the master batch pellets of the carbodiimide compound are dry-blended at the time of molding, may be used for molding.

The resin composition of the present invention can be set as 300 Pa·s or less of the melt viscosity at a temperature of 260° C. and a shear rate of 1000 sec$^{-1}$ in accordance with ISO 11443. Furthermore, the melt viscosity can also be set as 250 Pa·s or less. Unless the melt viscosity secures 300 Pa·s or less, the flowability becomes insufficient, and the resin may not be filled in the mold in some cases.

The resin composition of the present invention can achieve the tensile strength of 120 MPa or more, specifically 130 MPa or more in accordance with ISO 527.

The polybutylene terephthalate resin composition according to the present invention is particularly useful for the insert-injection molded articles used for application exposed to organic solvent and vapor thereof.

EXAMPLES

The present invention will be described in more detail in the following referring to the examples. However, the present invention is not limited to the examples.

Examples 1 to 10, Comparative Examples 1 to 6

The respective components shown in Table 1 were weighed and were dry-blended together. The obtained blend was then melt-kneaded in a 30 mm diameter double screw extruder (TEX-30, manufactured by The Japan Steel Works, Ltd.) at a cylinder temperature of 260° C., an extrusion rate of 15 kg/h, and a screw rotational speed of 150 rpm, to form pellets. By using the pellets prepared, test pieces were formed to measure various physical properties. Meanwhile, in Example 7, A-1 and C-1 were melt-kneaded in advance to prepare pellets, and the pellets were then blended with the B-5 master batch pellets. The blended pellets were then injection-molded to obtain test pieces for the evaluations. Results are shown in Table 1 and Table 2.

The detail of the components used and the measurement method for evaluating the physical properties are given below.
(A) Polybutylene Terephthalate Resin
  (A-1) Manufactured by WinTech Polymer Ltd.; intrinsic viscosity of 0.69, and amount of terminal carboxyl groups of 24 meq/kg
  (A-2) Manufactured by WinTech Polymer Ltd.; intrinsic viscosity of 0.70, and amount of terminal carboxyl groups of 44 meq/kg
(B) Carbodiimide Compound
  (B-1) Aromatic carbodiimide compound: Stabaxol P, manufactured by Rhein Chemie Japan Ltd.
  (B-2) Aromatic carbodiimide compound: Stabaxol P100, manufactured by Rhein Chemie Japan Ltd.
  (B-3) Aliphatic carbodiimide compound: Carbodilite HMV8CA, manufactured by Nisshinbo Chemical Inc.
  (B-4) Aliphatic carbodiimide compound: Carbodilite LA-1, manufactured by Nisshinbo Chemical Inc.
  (B-5) Polybutylene terephthalate master batch of aromatic carbodiimide compound: Stabaxol KE9193, manufactured by Rhein Chemie Japan Ltd.
  (B-6) Aromatic carbodiimide compound: Stabaxol P400, manufactured by Rhein Chemie Japan Ltd.
(C) Glass Fiber
  (C-1) ECS03-T127, manufactured by Nippon Electric Glass Co., Ltd.
(D) Elastomer Component
  (D-1) Ethylene ethylacrylate: Evaflex EEA A713, manufactured by DuPont Mitsui Polychemicals Co., Ltd.
(E) Mold Releasing Agent
  (E-1) Aliphatic ester: Licowax E, hydroxyl group value of 20 or less, manufactured by Clariant Japan K.K.
  (E-2) Aliphatic ester: Rikemal HT-10, hydroxyl group value of 120 to 160, manufactured by Riken Vitamin Co., Ltd.

[Melt Viscosity Characteristic]

The melt viscosity was measured in accordance with ISO 11443 under the condition of a cylinder temperature of 260° C. and a shear rate of 1000 sec$^{-1}$.

[Resistance to Heat Shock]

Pellets to be used were molded into an insert-molded article by insert-injection molding under the condition of a resin temperature of 260° C., a mold temperature of 65° C., an injection time of 25 sec, and a cooling time of 10 sec by using a mold for forming test piece (a mold inserting an iron core of 18 mm in length, 18 mm in width, and 30 mm in height into a rectangular cylinder of 22 mm in length, 22 mm in width, and 51 mm in height) so that the minimum thickness of a portion of resin section becomes 1 mm. The insert molded article obtained was subjected to heat shock resistance testing in which one cycle includes heating at 140° C. for one hour and 30 minutes by using a cold impact tester, and then lowering the temperature to −40° C. to cool for one hour and 30 minutes, and then further raising the temperature to 140° , and the number of cycles until the molded article generated cracks was measured to evaluate the resistance to heat shock.

[Pressure Cooker Test]

Pellets to be used were injection-molded to prepare ISO 3167 tensile test piece under the condition of a resin temperature of 260° C., a mold temperature of 80° C., an injection time of 15 sec, and a cooling time of 15 sec, and the tensile strength was measured in accordance with ISO 527. After that, by using the pressure cooker tester, the tensile test piece was exposed to an environment of 121 ° C. and 100% RH for 50 hours and 100 hours . From the tensile strength before and after the exposure, the tensile strength retention rate was calculated.

TABLE 1

|  |  | \multicolumn{10}{c}{Examples} |
|---|---|---|---|---|---|---|---|---|---|---|---|
|  |  | 1 | 2 | 3 | 4 | 5 | 6 | 7 | 8 | 9 | 10 |
| (A) | A-1 (parts by weight) | 100 | 100 | 100 | 100 | 100 | 100 | 100 | 100 | 100 | 100 |
|  | A-2 (parts by weight) |  |  |  |  |  |  |  |  |  |  |
| (B) | B-1 (parts by weight) | 0.4 | 0.8 |  |  |  |  |  |  | 0.8 | 0.8 |
|  | B-2 (parts by weight) |  |  | 0.4 | 0.8 |  |  |  |  |  |  |
|  | B-3 (parts by weight) |  |  |  |  | 0.6 |  |  |  |  |  |
|  | B-4 (parts by weight) |  |  |  |  |  | 0.6 |  |  |  |  |
|  | B-5 (parts by weight) |  |  |  |  |  |  | 5 |  |  |  |
|  | B-6 (parts by weight) |  |  |  |  |  |  |  | 0.7 |  |  |
| (C) | C-1 (parts by weight) | 43 | 43 | 43 | 43 | 43 | 43 | 45 | 43 | 45 | 45 |
| (D) | D-1 (parts by weight) |  |  |  |  |  |  |  |  |  |  |
| (E) | E-1 (parts by weight) |  |  |  |  |  |  |  |  | 0.75 |  |
|  | E-2 (parts by weight) |  |  |  |  |  |  |  |  |  | 0.75 |
| Carbodiimide equivalent/Amount of carboxyl group | | 0.5 | 0.9 | 0.5 | 0.9 | 1.0 | 1.0 | 1.0 | 0.9 | 0.9 | 0.9 |
| Evaluation | Melt viscosity (Pa · s) | 228 | 242 | 217 | 248 | 262 | 298 | — | 250 | 223 | 214 |
|  | Resistance to heat-shock | 180 | 420 | 260< | 280< | 270 | 280< | 280< | 300< | 218 | 130 |
|  | Tensile strength (MPa) | 155 | 153 | 157 | 154 | 152 | 149 | 155 | 151 | 154 | 152 |
|  | Tensile strength retention rate after 50 hr (%) | 85 | 80 | 84 | 86 | 76 | 84 | 85 | 87 | 80 | 75 |
|  | Tensile strength retention rate after 100 hr (%) | 41 | 65 | 33 | 51 | 28 | 37 | 55 | 50 | 63 | 59 |

|  |  | \multicolumn{6}{c}{Comparative Examples} |
|---|---|---|---|---|---|---|---|
|  |  | 1 | 2 | 3 | 4 | 5 | 6 |
| (A) | A-1 (parts by weight) |  | 100 | 100 | 100 | 100 | 100 |
|  | A-2 (parts by weight) | 100 |  |  |  |  |  |
| (B) | B-1 (parts by weight) | 1.5 |  | 1.4 |  |  |  |
|  | B-2 (parts by weight) |  |  |  |  |  |  |
|  | B-3 (parts by weight) |  |  |  |  |  |  |
|  | B-4 (parts by weight) |  |  |  |  |  |  |
|  | B-5 (parts by weight) |  |  |  |  |  |  |
|  | B-6 (parts by weight) |  |  |  |  |  |  |
| (C) | C-1 (parts by weight) | 43 | 43 | 43 | 50 | 45 | 45 |
| (D) | D-1 (parts by weight) |  |  |  | 17 |  |  |
| (E) | E-1 (parts by weight) |  |  |  |  | 0.75 |  |
|  | E-2 (parts by weight) |  |  |  |  |  | 0.75 |
| Carbodiimide equivalent/Amount of carboxyl group | | 1.0 | — | 1.8 | — | — | — |
| Evaluation | Melt viscosity (Pa · s) | 232 | 183 | 280 | 160 | 172 | 163 |
|  | Resistance to heat-shock | 300 | 60 | 500< | 94 | 54 | 57 |
|  | Tensile strength (MPa) | 155 | 161 | 150 | 115 | 159 | 160 |
|  | Tensile strength retention rate after 50 hr (%) | 63 | 60 | 60 | 92 | 60 | 58 |
|  | Tensile strength retention rate after 100 hr (%) | 30 | 29 | 46 | 77 | 30 | 28 |

[Resistance to Swelling]

The above ISO tensile test pieces (Example 1, Comparative Example 2, and Comparative Example 4) to be used were dipped into a fuel under a condition of 80° C. for 1000 hours, and the change rate of thickness was measured. Meanwhile, the fuel was regular gasoline, gas oil, and kerosene.

TABLE 2

|  |  | Example 1 | Comparative Example 2 | Comparative Example 4 |
|---|---|---|---|---|
| (A) | A-1 (parts by weight) | 100 | 100 | 100 |
|  | A-2 (parts by weight) |  |  |  |
| (B) | B-1 (parts by weight) | 0.4 |  |  |
|  | B-2 (parts by weight) |  |  |  |
|  | B-3 (parts by weight) |  |  |  |
|  | B-4 (parts by weight) |  |  |  |
|  | B-5 (parts by weight) |  |  |  |
| (C) | C-1 (parts by weight) | 43 | 43 | 50 |
|  | Elastomer (parts by weight) |  |  | 17 |
| Carbodiimide equivalent/Amount of carboxyl group | | 0.5 | — | — |
| Evaluation | Swelling by gasoline (%) | 1.3 | 1.3 | 2.5 |
|  | Swelling by gas oil (%) | 0.7 | 0.7 | 1.8 |
|  | Swelling by kerosene (%) | 0.5 | 0.5 | 2.3 |

As shown in Table 1, the composition of Examples combining the polybutylene terephthalate resin having 30 meq/kg or less of the amount of carbodiimide terminal group with a specific amount of the carbodiimide compound showed the effect of improving the high resistance to heat shock. Among these, Examples 1 to 4 and 7 which made use of aromatic carbodiimide compound also showed high tensile strength retention rate after 100 hours in the pressure cooker.

To improve the resistance to heat shock, normally the addition of elastomer is effective as shown in Comparative Example 4. In that case, however, there appeared lowering of the tensile strength in the initial stage, and there was observed swelling in the case of the exposure to organic solvent as shown in Table 2.

The invention claimed is:

1. A method of manufacturing a polybutylene terephthalate resin composition, comprising blending the composition, which consists of:
   100 parts by weight of a polybutylene terephthalate resin (A) having 24-30 meq/kg of terminal carboxyl groups;
   an aromatic carbodiimide compound (B) in an amount of 0.8 to 1.2 equivalents of the carbodiimide functional groups when the amount of terminal carboxyl groups in the polybutylene terephthalate resin (A) is set as 1;
   20 to 100 parts by weight of a fibrous filler (C);
   and optionally, at least one mold release agent.

2. A method of manufacturing a polybutylene terephthalate resin composition, comprising blending the composition, which consists of:
   100 parts by weight of a polybutylene terephthalate resin (A) having 24-30 meq/kg of terminal carboxyl groups;
   an aromatic carbodiimide compound (B) in an amount of 0.8 to 1.2 equivalents of the carbodiimide functional groups when the amount of terminal carboxyl groups in the polybutylene terephthalate resin (A) is set as 1; and
   20 to 100 parts by weight of a fibrous filler (C).

* * * * *